(12) United States Patent
Wilson et al.

(10) Patent No.: US 7,675,537 B2
(45) Date of Patent: Mar. 9, 2010

(54) SYSTEM, METHOD, AND APPARATUS FOR EXTENDING WIRELESS PERSONAL AREA NETWORKS USING CONFERENCING CONNECTION

(75) Inventors: George "Jed" D. Wilson, Austin, TX (US); Katharine D. Nogarede, Austin, TX (US); Charles Gregory Rousch, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 1013 days.

(21) Appl. No.: 11/278,321

(22) Filed: Mar. 31, 2006

(65) Prior Publication Data

US 2007/0264988 A1    Nov. 15, 2007

(51) Int. Cl.
*H04N 7/14* (2006.01)
(52) U.S. Cl. .............. 348/14.01; 348/14.02; 348/14.08; 370/261; 455/444; 455/41.2; 455/416

(58) Field of Classification Search ............... 455/416, 455/41.1, 42.1, 41.3, 556.1, 556.2, 557; 348/14.01–14.16; 370/260–261
See application file for complete search history.

(56) References Cited

U.S. PATENT DOCUMENTS

| | | | |
|---|---|---|---|
| 2004/0034723 A1* | 2/2004 | Giroti | 710/8 |
| 2004/0266439 A1* | 12/2004 | Lynch et al. | 455/444 |
| 2006/0114847 A1* | 6/2006 | Dssouli et al. | 370/261 |

* cited by examiner

*Primary Examiner*—Melur Ramakrishnaiah
(74) *Attorney, Agent, or Firm*—Wong, Cabello, Lutsch, Rutherford & Brucculeri LLP

(57) ABSTRACT

A system, method, and apparatus are disclosed whereby a wireless Personal Area Network such as a Bluetooth piconet may be extended to a remote location beyond the normal range by means of a conferencing connection. The conferencing connection may comprise, for example, one or more ISDN lines or an IP connection between two or more conference endpoints. The broadband connection may include a video channel, an audio channel, a control channel, and a Bluetooth channel.

36 Claims, 3 Drawing Sheets

SYSTEM, METHOD, AND APPARATUS FOR EXTENDING WIRELESS PERSONAL AREA NETWORKS USING CONFERENCING CONNECTION

BACKGROUND OF THE INVENTION

1. Field of the Invention

The present invention relates generally to conferencing, and more particularly, to extending the range of wireless piconets or wireless Personal Area Networks (PANs) by use of a conferencing connection.

2. Description of the Related Art

Audio conferencing and video conferencing enable geographically remote individuals or groups to communicate with each other from their respective locations. Conferencing serves a valuable purpose by reducing the time and expense required by traveling to meet in person. Accordingly, teleconferencing enables increased profitability, productivity, and efficiency within or among organizations. Conferencing also allows enterprises to speed decision-making and empower dispersed teams. Conferencing is particularly beneficial in the fields of business, medicine, education, and government.

In audio conferencing, speakerphones are examples of endpoint devices used to enable audio communication between participants at two or more sites. An example of a speakerphone can be found in the POLYCOM® SOUND-STATION® line of products. Video conferencing offers the additional ability to communicate graphic information and to view the facial expressions and body language of the conference participant(s) located at a remote site. Video conferencing offers the benefits of face-to-face communication without the inconvenience, expense, and uncertainty associated with traveling. An example of a video conferencing unit can be found in the POLYCOM® VIEWSTATION® line of products.

It is often desirable to share data with remote participants during a conference. Video conferencing and collaboration, together with data sharing and collaboration, allow increasingly dispersed organizations to pull their human and information resources together to create new ways of working and interacting. A video conferencing system can provide a rich and effective collaborative environment, even though participants may be thousands of miles apart.

SUMMARY OF THE INVENTION

Wireless devices are becoming increasingly prevalent. Eliminating wires offers flexibility and mobility, and eliminates clutter. Huge sums have been invested worldwide on wireless technologies and standards. Current wireless technologies, such as Bluetooth, 802.11, and IR (infrared), are limited, however, for use within a restricted range.

A need has therefore arisen to provide conferencing solutions that overcome the deficiencies of the prior art. Embodiments of the present invention advantageously combine features of long-distance audio and video conferencing with features of short-range wireless technology.

A video conferencing unit establishes a wireless piconet in the vicinity of the video conferencing unit. When engaged in an audio or video conference with one or more remote conferencing units, the piconet may be extended to include the remote locations using the data channels employed by the video conferencing system. In this way, devices in wireless communication with any one of the conferencing units can connect to a remote piconet to receive and/or transmit data over the conference connection. Embodiments of the present invention provide a Bluetooth bridge that allows virtual physical proximity.

Thus, during an audio or video conference, another mode of communication is advantageously provided, wherein remote devices can communicate wirelessly as if they are in the same room. For example, a wireless device at a near end can wirelessly transmit data to a near-end video conferencing unit, which sends the data via a conference connection to a far-end conferencing unit, which wirelessly transmits the data to a far-end wireless device. Examples of such wirelessly transmitted data include electronic business cards, images, Bluetooth pen data, Bluetooth whiteboard data, phone numbers, video numbers, calendar data, address book data, keyboard data, mouse data, audio from a wireless microphone, audio to a wireless loudspeaker, etc. Embodiments of the present invention therefore improve and enhance collaboration among remotely located parties.

DETAILED DESCRIPTION OF THE INVENTION

Figure 1:
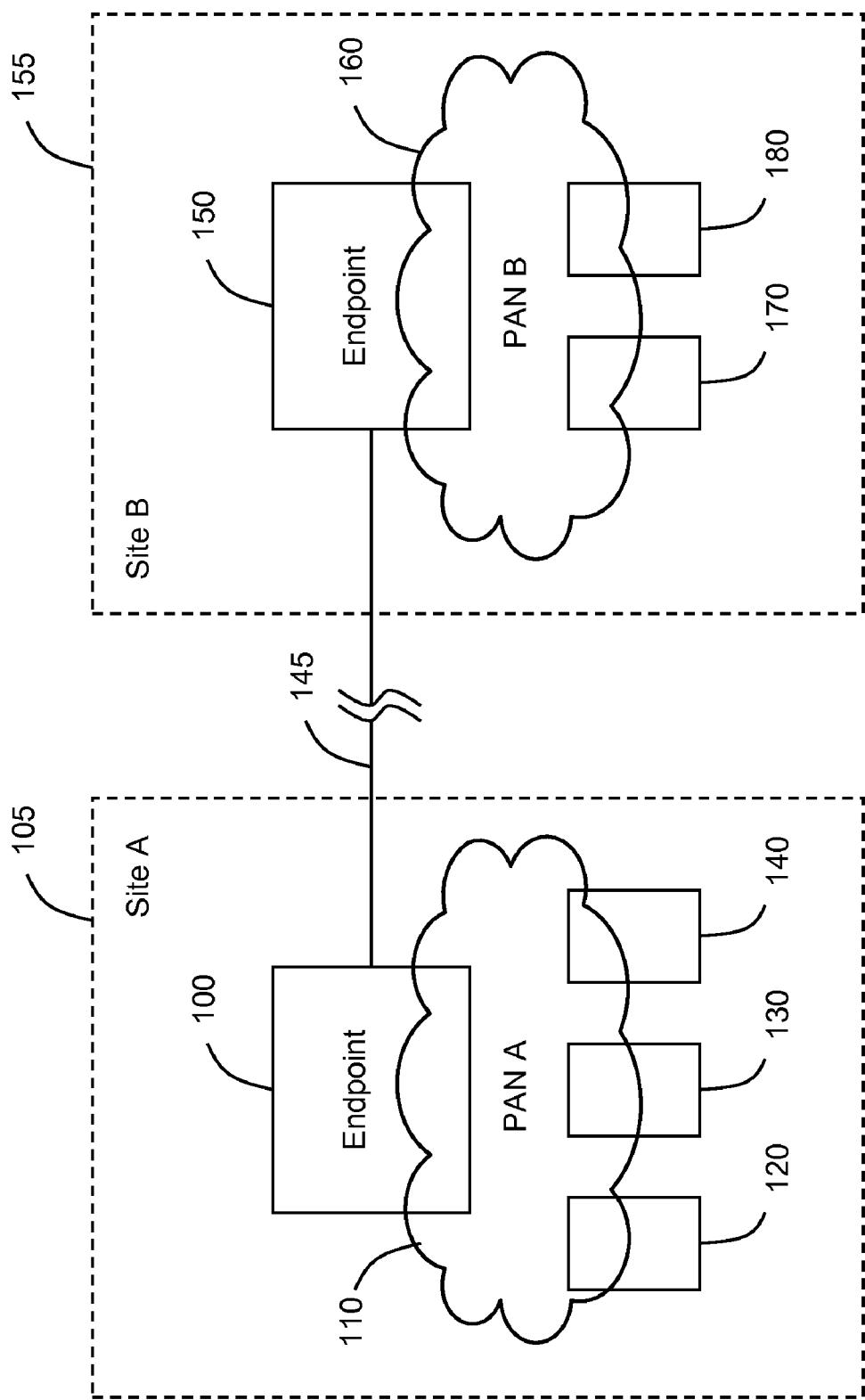
FIG. 1 depicts a block diagram of a conferencing system in accordance with one embodiment of the present invention.
Figure 3:
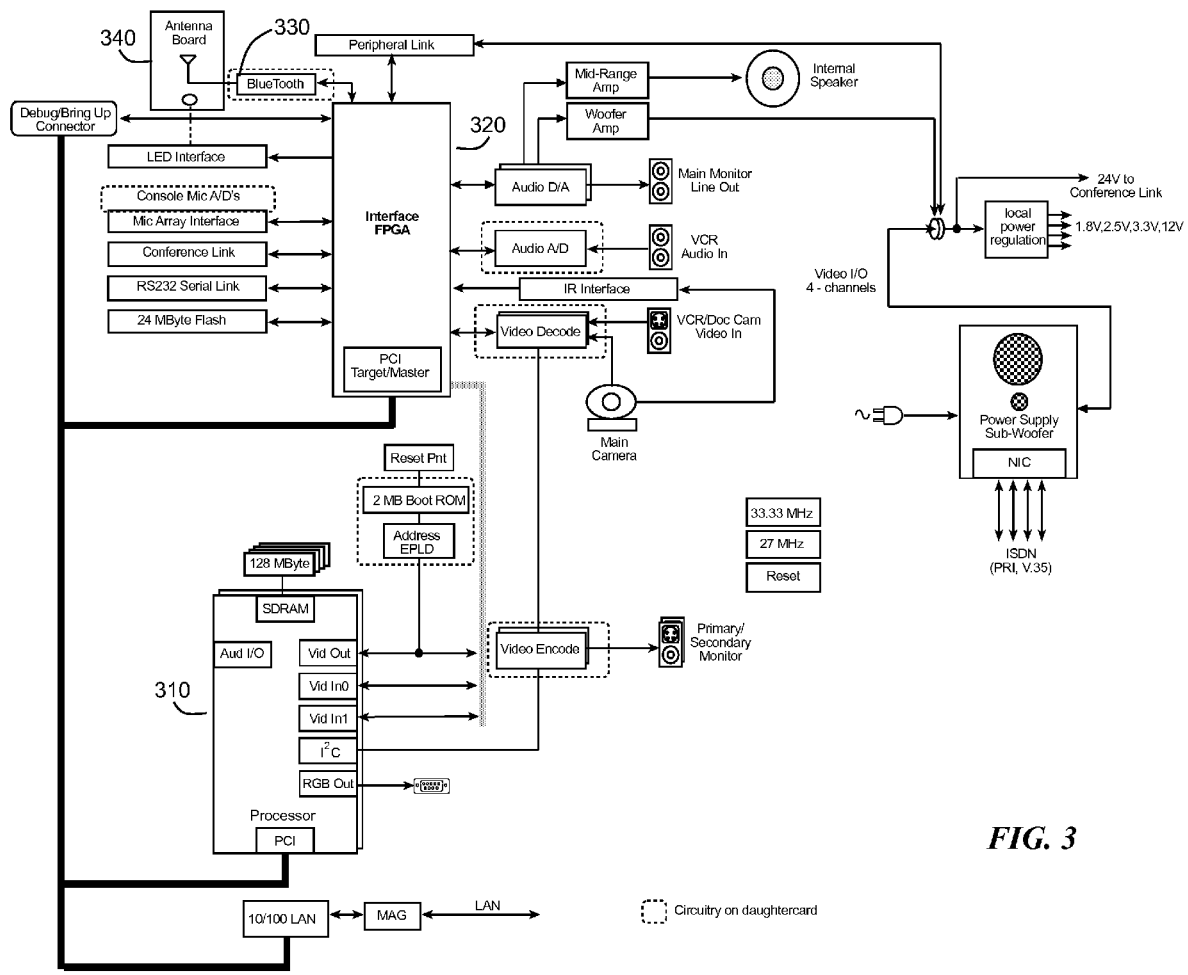
FIG. 3 depicts a block diagram of an exemplary video conferencing unit in accordance with one embodiment of the present invention.

Reference is now made to FIG. 1, which depicts a wireless-network-enabled conference endpoint 100 at a first physical location 105 (Site A). Endpoint 100 may comprise a wireless-network-enabled video conferencing unit (VCU). An exemplary block diagram of a suitable video conferencing unit is depicted in FIG. 3. In other embodiments, endpoint 100 may comprise a wireless-network-enabled audio conferencing unit without video capability. For example, endpoint 100 may comprise a wireless-network-enabled speakerphone comprising the components of the VCU of FIG. 3, excluding any video channels, video encoders, video decoders, video monitors, and video cameras.

Endpoint 100 is capable of establishing a radio-frequency Personal Area Network 110 (PAN A) with one or more similarly enabled devices 120, 130, and 140. In some embodiments, the one or more devices 120, 130, and 140 may comprise Bluetooth-enabled devices capable of short-range wireless communications according to the Bluetooth standard. The one or more devices 120, 130, and 140 may comprise such devices as, for example, a Personal Digital Assistant (PDA), a mobile phone, a printer, a laptop, a display device, a projector, a camera, a Bluetooth whiteboard, a Bluetooth pen, a speaker, a microphone, a headset, a keyboard, a mouse, and any other devices capable of communicating wirelessly in a PAN. PAN A 110 is not limited to a Bluetooth piconets and may, for example, comprise an Ultrawide Band ("UWB") network or other suitable network. In other embodiments, infrared (IR) or 802.11 communications may be used.

Also shown in FIG. 1 is a wireless-network-enabled conference endpoint 150 at a physical location 155 (Site B) which is remote from location 105 (Site A). Endpoint 150 may comprise a wireless-network-enabled video conferencing unit 150. An exemplary block diagram of a suitable video conferencing unit is depicted in FIG. 3. In other embodiments, endpoint 150 may comprise a wireless-network-enabled audio conferencing unit without video capability. For example, endpoint 150 may comprise a wireless-network-enabled speakerphone comprising the components of the VCU of FIG. 3, excluding any video channels, video encoders, video decoders, video monitors, and video cameras.

In one embodiment, endpoints 100 and 150 are capable of audiovideo (AV) and data communication via a conference connection 145. The conference connection 145 may comprise a video channel, an audio channel, a control channel, and a Bluetooth channel. The conference connection 145 may comprise, for example, one or more ISDN (Integrated Services Digital Network) lines, an Internet Protocol (IP) connection over a Local Area Network (LAN), a Wide Area Network (WAN), or the Internet, or any other suitable data communications means such as a fiber optic connection, microwave, or satellite link, etc. Any IP-based standard may be employed, whether now known or later developed. Examples of presently known IP-based standards include without limitation Real Time Transport Protocol (RTP), Real Time Streaming Protocol (RTSP), Session Initiation Protocol (SIP), H-Series (e.g., H.323, and H.324, etc.), and T-Series (e.g., T.120, etc.), among others. In other embodiments, wherein audio conferencing is enabled and video conferencing is not, conference connection 145 may comprise, for example, a VoIP (Voice over Internet Protocol), SIP, or ISDN connection.

Endpoint 150 is capable of establishing a wireless Personal Area Network 160 (PAN B) with one or more devices 170 and 180. PAN B 160 may comprise a Bluetooth piconet. The one or more devices 170 and 180 may comprise, for example, Bluetooth-enabled devices capable of short-range wireless communications using the Bluetooth system. The one or more devices 170 and 180 may comprise such devices as, for example, a Personal Digital Assistant (PDA), a mobile phone, a printer, a laptop, a display device, a projector, a camera, a Bluetooth whiteboard, a Bluetooth pen, a speaker, a microphone, a headset, a keyboard, a mouse, and any other devices capable of communicating wirelessly in a PAN.

Using connection 145, PAN A 110 may be linked to PAN B 160 such that devices 120, 130, 140, 170, and 180 (and any other devices which may join PAN A or PAN B) are in data communication with one another. Video conferencing connection 145 therefore allows virtual physical proximity of devices that are hundreds or thousands of miles away.

While FIG. 1 depicts a point-to-point conferencing system, the system can be scaled to provide for multipoint conferencing, in which additional video conferencing units are linked by connection 145. Connection 145 may comprise a multipoint control unit (MCU) to enable multiple video conferencing units to join in a single video conference. In a three-party conference, for example, wherein each PAN comprises a Bluetooth piconet, the maximum number of devices in each PAN is tripled.

Bluetooth is a standard and a specification for small form-factor, low-cost, short-range radio links between mobile PCs, mobile phones, peripherals, and other portable devices. Unlike conventional radio operator networks, a Bluetooth piconet does not require an access point and, unlike infrared communication (e.g., per the IrDA standard), Bluetooth does not require a line-of-sight connection.

Bluetooth devices can function in circuit switched mode and packet switched mode. Circuit switched mode is the most common mode for voice communication, while packet switched mode is usually preferred for Internet data and higher bandwidth mobile communication systems.

A Bluetooth Personal Area Network includes a master and up to seven slaves, thereby permitting the interconnection of up to eight devices in a limited radius (e.g., 10 meters). In a process referred to as Device Discovery, the master seeks devices by broadcasting requests; those slaves which are in a "discoverable" state answer with their identification numbers. Data encryption is available for those users and applications that require additional security.

Bluetooth profiles are published definitions of implementations of Bluetooth wireless technology for particular uses. Profiles are the "services" offered by a device. In order for two Bluetooth-enabled devices to interoperate to complete a user task, both devices must implement a set of common profiles.

The signal transmitted by the Bluetooth link may be either half-duplex or full-duplex. Full duplex links in a Bluetooth piconet can send data at more than 64 Kbps—a speed sufficient to accommodate several voice channels. A half-duplex link can be established with a data rate of 721 kilobits per second in one direction and 57.6 Kbps in the other. If a half-duplex link having the same speed in both directions is required, a link with 432.6 Kbps in each direction can be made.

Unlike many other wireless standards, the Bluetooth wireless specification includes both link layer and application layer definitions for product developers which support data, voice and content-centric applications.

The Bluetooth protocol architecture is further described in the Bluetooth specification. The contents of the most recent Bluetooth Specification Rev v2.0+EDR, dated Nov. 4, 2004, which can be found at http://www.bluetooth.com, are incorporated herein by reference. The principles of various embodiments of the present invention may be used, however, with prior and next generations of the Bluetooth specification.

The Bluetooth specification may be described as a protocol stack with the Bluetooth Radio layer as its base. The radio layer defines the requirements for a Bluetooth transceiver operating in the 2.4 GHz ISM (industrial, scientific and medical) band. A transceiver that takes part in a power-controlled link must be able to measure its own receiver signal strength and determine if the transmitter on the other side of the link should increase or decrease its output power level. A Receiver Signal Strength Indicator (RSSI) makes this possible. The instructions to alter the transmitter power are carried in the LMP (Link Manager Protocol) link.

Above the radio layer in the Bluetooth stack is the Baseband layer which describes the specification of the Bluetooth Link Controller (LC) which carries out the baseband protocols and other low-level link routines. The baseband is the physical layer of the Bluetooth stack. It manages physical channels and links apart from other services like error correction, data whitening, hop selection and Bluetooth security. The baseband protocol is implemented as a Link Controller which works with the link manager for carrying out link level routines like link connection and power control. The baseband also manages asynchronous and synchronous links, handles packets and does paging and inquiry to access and inquire Bluetooth devices in the area. The baseband transceiver applies a time-division duplex (TDD) scheme (alternate transmit and receive). Therefore, apart from the different hopping frequency (frequency division), the time is also slotted.

Thirteen different packet types are defined for the baseband layer of the Bluetooth system. Each packet consists of three entities: the access code (68/72 bits), the header (54 bits), and the payload (0-2745 bits). Access codes are used for timing synchronization, offset compensation, paging and inquiry. The header contains information for packet acknowledgement, packet numbering for out-of-order packet reordering, flow control, slave address and error check for header. The packet payload can contain voice field, data field or both. If it has a data field, the payload will also contain a payload header.

A Bluetooth controller operates in two major states: Standby and Connection. There are seven sub-states which are used to add slaves or make connections in the piconet. These are page, page scan, inquiry, inquiry scan, master response, slave response and inquiry response. The Standby state is the default low power state in the Bluetooth unit. Only the native clock is running and there is no interaction with other devices. In the Connection state, the master and slave can exchange packets, using the channel (master) access code and the master Bluetooth clock.

The Link Manager carries out link setup, authentication, link configuration and other protocols. It discovers other remote Link Managers and communicates with them via the Link Manager Protocol (LMP). To perform its service provider role, the Link Manager uses the services of the underlying Link Controller (LC).

The Link Manager Protocol essentially consists of a number of PDU (protocol Data Units), which are sent from one device to another, determined by the AM_ADDR in the packet header. Link Manager PDUs are always sent as single-slot packets and the payload header is therefore one byte.

When a connection has been established between two Bluetooth devices, the connection consists of an ACL link. One or more SCO links can then be established.

Each Bluetooth link has a timer that is used for link supervision. This timer is used to detect link loss caused by devices moving out of range, the power-down of a device, or other similar failure. An LMP procedure is used to set the value of the supervision timeout.

The Host Controller Interface (HCI) provides a command interface to the Baseband Link Controller and Link Manager and access to hardware status and control registers. It provides a uniform command method of accessing the Bluetooth baseband capabilities. The HCI Link commands provide the host with the ability to control the link layer connections to other Bluetooth devices. These commands allow the Link Manager to exchange LMP commands with remote Bluetooth devices.

The Logical Link Control and Adaptation Protocol (L2CAP) is above the Baseband Protocol in the Bluetooth stack and resides in the data link layer. It supports higher level protocol multiplexing, packet segmentation and reassembly, and the conveying of quality of service information. L2CAP permits higher level protocols and applications to transmit and receive L2CAP data packets up to 64 kilobytes in length. Both Synchronous Connection-Oriented (SCO) links and Asynchronous Connection-Less (ACL) links are supported. L2CAP is packet-based, but follows a communication model based on channels. A channel represents a data flow between L2CAP entities in remote devices. Channels may be connection-oriented or connectionless. L2CAP relies on the flow control mechanism provided by the Link Manager layer in the baseband.

The RFCOMM protocol provides emulation of RS-232 serial ports over the L2CAP protocol. Two device types exist that RFCOMM accommodates: Type 1 devices (communication end points such as computer and printers); and, Type 2 devices (devices that are part of the communication segment such as modems). On Type 1 devices, some port drivers must provide flow control services as specified by the API they are emulation. For example, an application may request a particular flow control mechanism such as XON/XOFF or RTS/CTS and expect the port driver to handle the flow control. On Type 2 devices, the port driver may need to perform flow control on the non-RFCOMM part of the communication path—the physical RS-232 port.

The Service Discovery Protocol (SDP) provides a means for applications to discover which services are provided by or available through a Bluetooth device. It also allows applications to determine the characteristics of those available services. A specific Service Discovery protocol is required in the Bluetooth environment inasmuch as the set of services that are available changes dynamically based on the RF proximity of Bluetooth-enabled devices which may be in motion. SDP uses a request/response model wherein each transaction consists of one request protocol data unit (PDU) and one response PDU. Every SDP PDU consists of a PDU header followed by PDU-specific parameters. The header contains three fields: a PDU ID which identifies the type of PDU; a TransactionID field which uniquely identifies request PDUs thereby permitting the matching of response PDUs to request PDUs; and, a ParameterLength field that specifies the length (in bytes) of all parameters contained in the PDU.

SDP allows Bluetooth-enabled devices to discover what other Bluetooth-enabled devices have to offer in the way of services. The process of looking for any offered services is generally referred to as "browsing"; "searching" generally refers to looking for a specific service. In SDP, the mechanism for browsing for services is based on an attribute shared by all services classes called the BrowseGroupList attribute. The value of this attribute contains a list of Universally Unique Identifiers (UUIDs). Each UUID represents a browse group with which a service may be associated for the purpose of browsing.

Figure 2:
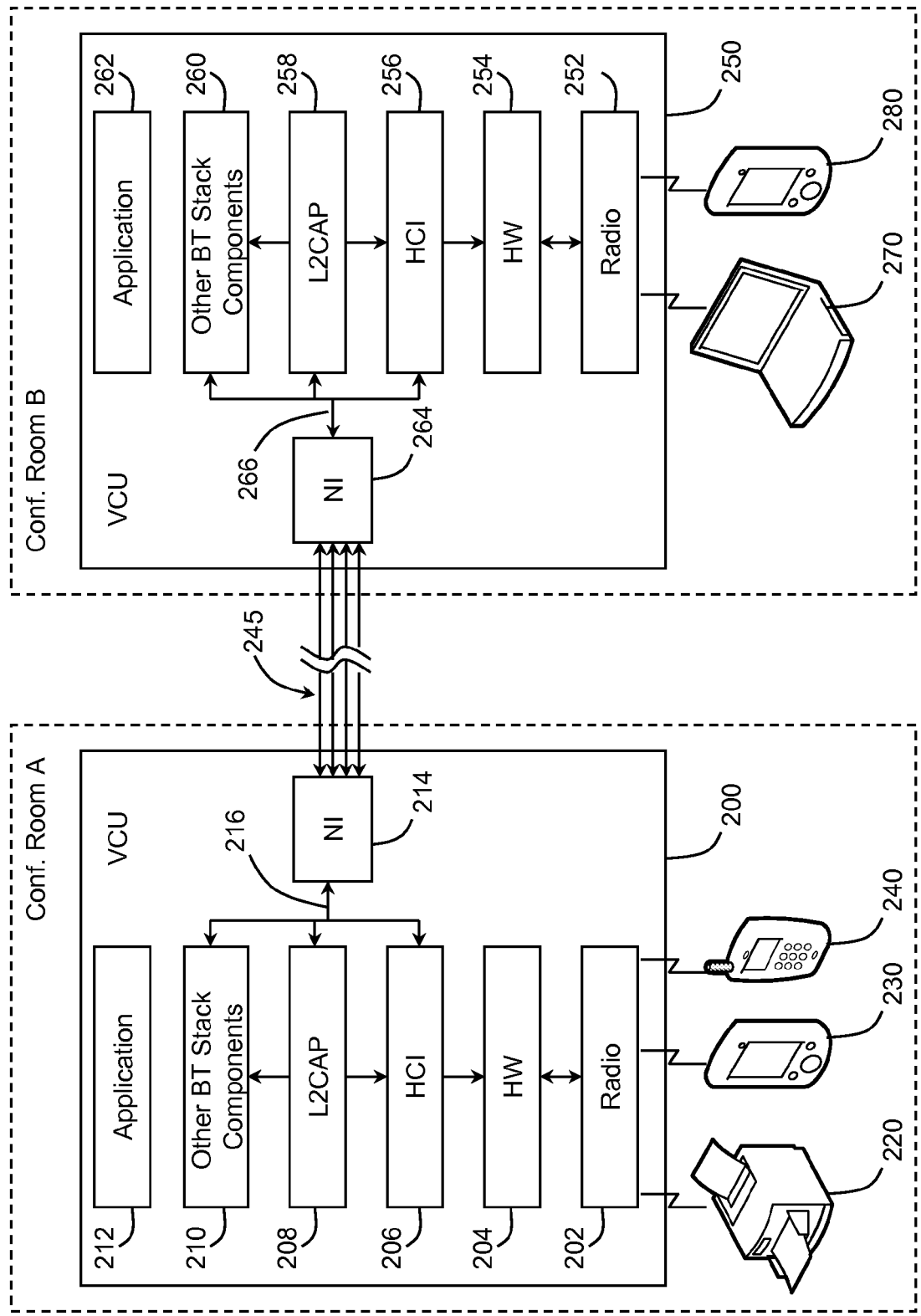
FIG. 2 depicts a block diagram of an exemplary video conferencing system in accordance with one embodiment of the present invention.

Reference is now made to FIG. 2, which depicts a block diagram of an exemplary video conferencing system in accordance with one embodiment of the present invention. In the example of FIG. 2, a video conferencing unit 200 in a conference room A is capable of establishing a radio-frequency PAN with various Bluetooth-enabled devices in conference room A. In the present example, the Bluetooth-enabled devices in the PAN in conference room A include a printer 220, a PDA 230, and a cellular telephone 240. Other Bluetooth-enabled devices, including but not limited to those described above in connection with FIG. 1, may be included in the PAN in conference room A.

Various layers of the video conferencing unit 200, including radio layer 202, hardware layer 204, HCI layer 206, L2CAP layer 208, other Bluetooth stack components 210, and application layer 212 are depicted in FIG. 2. Additional layers may be included, such as those as described in the Bluetooth specification, but are not illustrated for purposes of simplicity.

A network interface (NI) 214 is linked to the HCI layer 206 via channel 216. The network interface 214 may operate according to the H.323 standard for audio, video, and data communications across IP-based networks, including the Internet. The network interface 214 may also operate according to the H.320 standard for ISDN video conferencing. The network interface 214 may also operate according to other standards and protocols, whether currently known or later developed. In accordance with the present embodiment, channel 216 may comprise a proprietary RTP channel for sending and receiving Bluetooth data.

The video conferencing unit 200 in conference room A is capable of sending and receiving audio, video, and data via a broadband connection 245, to and from a video conferencing unit 250 in conference room B, which is remote from conference room A. In the present example, the broadband connection 245 may comprise, for example, a connection via an IP network or ISDN line. The conference connection 245 may comprise a video channel, an audio channel, a control channel, and a Bluetooth channel.

Various layers of the video conferencing unit 250, including radio layer 252, hardware layer 254, HCI layer 256, L2CAP layer 258, other Bluetooth stack components 260, and application layer 262 are depicted in FIG. 2. Additional layers may be included, such as those as described in the Bluetooth specification, but are not illustrated for purposes of simplicity.

A network interface 264 is linked to the HCI layer 256 via channel 266. In accordance with the present embodiment, channel 266 may comprise a proprietary RTP channel for sending and receiving Bluetooth data. The network interface 264 may operate according to the H.323 standard for audio, video, and data communications across IP-based networks, including the Internet. The network interface 264 may also operate according to the H.320 standard for ISDN video conferencing. The network interface 264 may also operate according to other standards and protocols, whether currently known or later developed.

The video conferencing unit 250 in conference room B is capable of establishing a radio-frequency PAN with various Bluetooth-enabled devices in conference room B. In the present example, the Bluetooth-enabled devices in the PAN in conference room B include a personal computer 270 (such as a handheld PC or a laptop PC, etc.) and a PDA 280.

Once a conference is connected, such as, for example, an H.323 or H.320 video conference, the VCUs 200 and 250 exchange data pertaining to their respective capabilities. For example, VCU 200 may communicate that it is able to send and receive video, audio, and Bluetooth data, and VCU 250 may also communicate that it is able to send and receive video, audio, and Bluetooth data.

Following the capabilities exchange, the act of device identification (also referred to as device discovery) is performed. Each of the VCUs 200 and 250 performs a radio scan both locally and remotely, and the results are collected and exchanged. Therefore, in the example of FIG. 2, VCU 200 discovers local devices (printer 220, PDA 230, and cellular telephone 240) and remote devices (PC 270 and PDA 280); VCU 250 discovers local devices (PC 270 and PDA 280) and remote devices (printer 220, PDA 230, and cellular telephone 240). All such devices (printer 220, PDA 230, cellular telephone 240, PC 270, and PDA 280) appear as if they are in the same room and in the same radio network. Each device has an address (e.g., a network address, etc.) and a set of attributes (e.g., what Bluetooth profile is supported such as headset profile, data exchange profile, etc.).

In one exemplary illustration of the principles of the present invention, PDA 230 in conference room A and PDA 280 in conference room B can perform an RS232 data exchange and thereby exchange contact information in the form of electronic business cards via connection 245. The data exchange occurs as if they were in the same physical piconet, even though their respective physical locations may be hundreds or thousands of miles apart.

A method for exchanging contact information between Bluetooth PDAs may be performed as follows. First, the PDAs each search for like devices. Next, a connection is established between the PDAs, such as PDA 230 and PDA 280 of FIG. 2. The data including the electronic business card data (which may be, for example, stored in vCard or text format) is transmitted pursuant to the device profiles. An application implementing the exchange of such data may be based on the Object Push profile specified in Bluetooth v1.1 profiles. Finally, the connection is closed.

In another exemplary illustration of the principles of the present invention, a conference participant can directly dial a video number or a phone number from his or her PDA 230, PDA 280, or cellular telephone 240, etc. Users often store address books and contact information in their PDAs and cellular telephones. Allowing users to directly dial such numbers advantageously allows users to keep their contact information in a central repository.

A method for directly dialing a number from a wireless device such as a Bluetooth PDA may be performed as follows. First, a conference participant dials a video or audio number stored in the directory of his or her PDA, such as PDA 230 of FIG. 2. The video conferencing unit 200 includes a phone driver. The PDA 230 connects to the video conferencing unit 200 and sends the number over the Bluetooth link 216 to the video conferencing unit 200, which subsequently dials the number.

In another exemplary illustration of the principles of the present invention, conference participants can synchronize a set of data such as address books or calendars stored in their wireless devices. An application implementing the synchronization of such address book or calendar data may be based on the Object Synchronization Profile specified in Bluetooth v1.1 Profiles.

In another exemplary illustration of the principles of the present invention, conference participants may engage in collaborative drawing. For example, a near-end user may draw on his or her PDA and share the drawing with the far end. An application implementing the drawing collaboration is developed on top of the SDK (software development kit) of the specific PDA being used and is based on the particular profile the SDK uses.

In another exemplary illustration of the principles of the present invention, an audio phone call can be added into a video conference. The conferencing station, such as VCU 200, includes a built-in POTS-like audio port, for a Bluetooth cell phone, such as cellular telephone 240. The conferencing station acts as a Bluetooth headset, while the Bluetooth cell phone acts as an audio gateway. An application implementing this feature can be based on the Headset Profile (or Handsfree Profile) specified in Bluetooth v1.1 Profiles.

In another exemplary illustration of the principles of the present invention, a conference participant can draw on a whiteboard to show his or her idea to other conference participants. Instead of moving the video camera to point to the whiteboard or using a wired whiteboard, the image can be sent wirelessly to the VCU, which then transfers the image to the far end and displays the drawing on a display device. Thus, a Bluetooth whiteboard may join the PAN in conference room A, and drawings on the Bluetooth whiteboard may be viewed on a monitor in remotely located conference room B. An application implementing this feature can be based on the Serial Port Profile and developed on top of the particular whiteboard vendor's SDK.

In another exemplary illustration of the principles of the present invention, a conference participant may draw a diagram on a piece of paper using a Bluetooth pen such as that licensed by Anoto. A Bluetooth pen captures the image, and sends it over the Bluetooth link to the video conference unit. An application implementing this feature can be based on Anoto's SDK.

In another exemplary illustration of the principles of the present invention, a more user-friendly way is provided for navigating UI (user interface) items or receiving user input by using a Bluetooth-enabled mouse and keyboard. An application implementing this feature may be based on the HID (human interface device) profile specified in Bluetooth v1.1 Profiles.

In another exemplary illustration of the principles of the present invention, audio data can be transferred wirelessly from a Bluetooth-enabled microphone to the VCU base station. Whereas a traditional micpod is wire-connected to the base station, which makes room integration harder, a wireless micpod may instead be used. An application implementing this feature can be based on a proprietary protocol to achieve the highest data throughput out of the Bluetooth link 216.

In another exemplary illustration of the principles of the present invention, an application running on the VCU provides the ability to print files such as documents, slides, and business cards, etc. from the far end during a conference. For example, a document stored on personal computer 270 in conference room B can be printed at printer 220 in remotely located conference room A. The application implementing this feature can be based on one or more of the following profiles which provide Bluetooth printing functionalities: Basic Printing Profile, Hardcopy Cable Replacement Profile, Basic Imaging Profile, PAN profile, Object Push Profile, or Serial Port Profile, etc., depending on the particular printer.

In another exemplary illustration of the principles of the present invention, the above-described applications, e.g., synchronization, collaboration, etc., may be combined depending on what application you have on your PC. Windows® and Mac OS provide some Bluetooth support. Applications can be based on the OS support and profiles, or used with third-party applications.

FIG. 3 depicts a block diagram of an exemplary video conferencing unit according to one embodiment of the invention. The video conferencing unit comprises a media processor 310 in data communication with an interface 320 comprised of a Field-Programmable Gate Array (FPGA). Bluetooth module 330 is connected to antenna board 340 for RF communication and to interface 320 for data communication. A high-speed serial link may be used to connect Bluetooth module 330 and interface 320. Bluetooth module 330 comprises software and code for communicating according to the Bluetooth specification. Bluetooth module 330 may comprise software for implementing any of the above-described applications for business card exchange, direct dialing, data synchronization, drawing collaboration, adding an audio call, Bluetooth whiteboard transmission, Bluetooth pen imaging, Bluetooth user inputs, wireless microphones, wireless printing, and wireless PC applications, among others. In other embodiments, communications may be carried out according to a different standard or protocol, such as UWB, 802.11, IR, or other wireless communication specification.

Various components shown in FIG. 3 may be external to the video conferencing unit. For example, one or more of the cameras, monitors, microphones, speakers, and sub-woofer may be external to the video conferencing unit.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of extending a wireless Personal Area Network (PAN), the method comprising the acts of:
    establishing a first PAN comprising a first PAN-enabled device and a first PAN-enabled conferencing unit;
    establishing a conferencing connection between the first PAN-enabled conferencing unit and a second PAN-enabled conferencing unit, wherein the second PAN-enabled conferencing unit is at a location remote from the first PAN-enabled conferencing unit;
    establishing a second PAN comprising a second PAN-enabled device and the second PAN-enabled conferencing unit; and
    linking the first PAN to the second PAN via the conferencing connection.

2. The method as recited in claim 1, wherein the first PAN-enabled device, the second PAN-enabled device, the first PAN-enabled conferencing unit, and the second PAN-enabled conferencing unit each comply with the Bluetooth specification.

3. The method as recited in claim 1, wherein the conferencing connection comprises a Bluetooth channel.

4. The method as recited in claim 1, wherein the conferencing connection comprises an ISDN line.

5. The method as recited in claim 1, wherein the conferencing connection comprises an Internet Protocol connection.

6. The method as recited in claim 1, wherein the conferencing connection comprises a broadband connection.

7. The method as recited in claim 1, wherein the first PAN-enabled conferencing unit comprises a video conferencing unit.

8. The method as recited in claim 1, wherein the first PAN-enabled conferencing unit comprises an audio conferencing unit.

9. A method of extending a wireless Personal Area Network (PAN), the method comprising the acts of:
    establishing a first PAN comprising a first Bluetooth-enabled device and a first Bluetooth-enabled video conferencing unit;
    establishing a second PAN comprising a second Bluetooth-enabled device and a second Bluetooth-enabled video conferencing unit, wherein the second Bluetooth-enabled video conferencing unit is at a location remote from the first Bluetooth-enabled video conferencing unit;
    establishing a video conferencing connection between the first Bluetooth-enabled conferencing unit and the second Bluetooth-enabled video conferencing unit; and
    linking the first PAN to the second PAN via the video conferencing connection.

10. The method as recited in claim 9, wherein the video conferencing connection comprises an audio channel, a video channel, a control data channel, and a Bluetooth channel.

11. The method as recited in claim 9, wherein the video conferencing connection comprises an ISDN line.

12. The method as recited in claim 9, wherein the video conferencing connection comprises an Internet Protocol connection.

13. The method as recited in claim 9, wherein the video conferencing connection comprises a broadband connection.

14. A method of exchanging data via a wireless Personal Area Network (PAN), the method comprising the acts of:
    establishing a first PAN comprising a first PAN-enabled device and a first PAN-enabled video conferencing unit;
    establishing a second PAN comprising a second PAN-enabled device and a second PAN-enabled video conferencing unit, wherein the second PAN enabled video conferencing unit is at a location remote from the first PAN-enabled video conferencing unit;
    establishing a video conferencing connection between the first PAN-enabled conferencing unit and the second PAN-enabled video conferencing unit;

linking the first PAN to the second PAN via the video conferencing connection;

determining respective capabilities of the first PAN-enabled video conferencing unit and the second PAN-enabled video conferencing unit;

identifying one or more devices in the first PAN;

identifying one or more devices in the second PAN; and transmitting data from the first PAN-enabled device to the second PAN enabled device.

15. The method as recited in claim 14, wherein the data transmitted from the first PAN-enabled device to the second PAN-enabled device comprises an electronic business card.

16. The method as recited in claim 14, wherein the data transmitted from the first PAN-enabled device to the second PAN-enabled device comprises an image drawn on a Bluetooth-enabled whiteboard.

17. The method as recited in claim 14, wherein the data transmitted from the first PAN-enabled device to the second PAN-enabled device comprises an image drawn using a Bluetooth-enabled pen.

18. The method as recited in claim 14, wherein the data transmitted from the first PAN-enabled device to the second PAN-enabled device comprises an image drawn on a PDA.

19. A conferencing system for enabling wireless communications via a virtual Personal Area Network (PAN), the system comprising:

a first wireless PAN comprising a first PAN-enabled conferencing unit, a first PAN-enabled device, and a second PAN-enabled device; and a second wireless PAN comprising a second PAN-enabled conferencing unit, the first PAN-enabled device, and the second PAN-enabled device;

wherein the first PAN-enabled conferencing unit and the first PAN-enabled device are at a first location;

wherein the second PAN-enabled conferencing unit and the second PAN-enabled device are at a second location that is physically remote from the first location; and wherein the first PAN-enabled conferencing unit and the second PAN-enabled conferencing unit are capable of communicating via a conference connection.

20. The system as recited in claim 19, wherein the conference connection comprises a Bluetooth channel.

21. The system as recited in claim 19, wherein the conference connection comprises an ISDN line.

22. The system as recited in claim 19, wherein the conference connection comprises an Internet Protocol connection.

23. The system as recited in claim 19, wherein the conference connection comprises a broadband connection.

24. The system as recited in claim 19, wherein the first PAN-enabled device comprises a Personal Digital Assistant.

25. The system as recited in claim 19, wherein the first PAN-enabled device comprises a personal computer.

26. The system as recited in claim 19, wherein the first PAN-enabled device comprises a mobile telephone.

27. The system as recited in claim 19, wherein the first PAN-enabled device comprises a camera.

28. The system as recited in claim 19, wherein the first PAN-enabled device comprises a microphone.

29. The system as recited in claim 19, wherein the first PAN-enabled device comprises a speaker.

30. The system as recited in claim 19, wherein the first PAN-enabled device comprises a Bluetooth whiteboard.

31. The system as recited in claim 19, wherein the first PAN-enabled device comprises a Bluetooth pen.

32. The system as recited in claim 19, wherein the first PAN-enabled device comprises a printer.

33. The system as recited in claim 19, wherein the first PAN-enabled device comprises a mouse.

34. The system as recited in claim 19, wherein the first PAN-enabled device comprises a keyboard.

35. The system as recited in claim 19, wherein the first PAN-enabled conferencing unit comprises a video conferencing unit.

36. The system as recited in claim 19, wherein the first PAN-enabled conferencing unit comprises an audio conferencing unit.

* * * * *